United States Patent [19]
Carrell

[11] Patent Number: 4,697,689
[45] Date of Patent: Oct. 6, 1987

[54] ARTICLE MANIPULATION SYSTEM
[75] Inventor: Ross M. Carrell, Burlington County, N.J.
[73] Assignee: RCA Corporation, Princeton, N.J.
[21] Appl. No.: 813,422
[22] Filed: Dec. 26, 1985
[51] Int. Cl.[4] .............................................. B65G 47/24
[52] U.S. Cl. ..................................... 198/394; 198/396; 198/444; 198/404; 414/756; 414/757; 414/760
[58] Field of Search ................................. 198/394–396, 198/404, 464.2, 444, 572, 699.1; 414/756, 757, 768, 760, 781, 776, 784, 774

[56]         References Cited
          U.S. PATENT DOCUMENTS

| | | | |
|---|---|---|---|
| 1,962,772 | 6/1934 | Hull et al. | 414/756 |
| 2,677,452 | 5/1954 | Mallow et al. | 198/33 |
| 3,237,757 | 3/1966 | Perkins | 198/699.1 |
| 3,592,326 | 7/1971 | Zimmerle et al. | 198/395 |
| 3,840,739 | 10/1974 | Coulter | 250/202 |
| 3,868,024 | 2/1975 | Lee | 414/756 |
| 4,147,930 | 4/1979 | Browne et al. | 198/394 |
| 4,150,743 | 4/1979 | Lazzarotti et al. | 198/444 |
| 4,435,837 | 3/1984 | Abernathy | 382/41 |
| 4,634,328 | 1/1987 | Carrell | 198/444 |

Primary Examiner—Joseph E. Valenza
Attorney, Agent, or Firm—Allen L. Limberg; Henry I. Steckler

[57]            ABSTRACT

A system for manipulating articles, such as irregular mailpieces in the U.S. Postal Service mail processing system, receives an agglomeration of parcels into a first subsystem where the parcels are separated and are passed to a second subsystem where each parcel is manipulated until its addressee label is directed upward. The first subsystem includes a plurality of individually rotatable cylindrical rollers which form a support surface for the parcels. The rollers produce translation of a parcel by cooperative motion or separation of parts of a pile of parcels by differential motion. The second subsystem includes a high-friction, flexible conveyor belt which in a first mode supports a parcel and in a second mode forms a downward loop in which a parcel can be rotated and inverted. The parcels in both subsystems are manipulated by a five-axis robotic arm which is responsive to a machine vision system measuring the position and physical characteristics of each parcel.

15 Claims, 8 Drawing Figures

ARTICLE MANIPULATION SYSTEM

The United States Government has right in this invention pursuant to Contract No. 104230-84-D-0929 awarded by the United States Postal Service.

This invention relates generally to article handling systems and, more particularly, to a system for separating individual articles from a heap and then orienting each article with a particular side upward.

BACKGROUND OF THE INVENTION

In a mail handling system, as, for example, in the United States Postal Service, the majority of mail traffic consists of ordinary business-size envelopes and large (bulk mail) parcels. They are handled by automatic machinery which accepts mail pieces falling within a specific range of sizes and shapes. There is a residue, however, that cannot be handled by existing machinery. This residue comprises a few percent of the immense mail volume and its handling is, therefore, a significant problem costing hundreds of millions of dollars each year.

One category of this residual mail is known as "irregular pieces and parcels" which includes small boxes, film mailers, rolled newspapers, tubes, hotel keys, small bags, etc. Another group, referred to as "flats", consists of generally flat mail pieces such as tabloid weekly newspapers, magazines, oversized envelopes, packs of inquiry cards, and stuffed envelopes containing, for example, bank statements with return checks. Open magazines, without sleeves, are especially difficult to handle by machine. This type of mail includes much of the periodical and advertising mail, which accounts for little revenue but which requires a large labor force for processing.

In the handling of these irregular mailpieces, there is quite obviously a need for automation in order to provide speedy, accurate and cost-effective processing. In particular, when an agglomeration of these mailpieces is presented for destination coding by an operator, it would be advantageous to separate the individual items from the heap, locate the zip code, present the stamp face up for cancellation, present the zip code to an operator who keys it into the system, and dispatch it into an appropriate hamper with items having a similar destination.

The process of separating one mailpiece from a pile is referred to as singulation. There have been attempts to singulate irregular mailpieces by variations of conventional material handling techniques, e.g., differential motion or spreading. These techniques work well when the machines are designed for a uniform stream of a known article. However, they became less than efficient for uncontrolled mixes of unpredictable articles. One mail singulation system for automatically singulating irregular mail is disclosed in U.S. Pat. No. 4,634,28, issued Jan. 6, 1987, to R. M. Carrell. In this system a robotic arm operated in conjunction with a machine vision apparatus, pushes individual articles from heap onto a take away conveyor.

SUMMARY OF THE INVENTION

In accordance with the principles of the present invention, an apparatus is disclosed for overturning generally flat articles. The apparatus comprises a flexible, endless conveyor belt and first and second means for producing longitudinal motion of the conveyor belt. Means are provided for supporting the portion of the conveyor belt intermediate the first and second belt motion producing means in a substantially horizontal plane. The apparatus also comprises first and second drive means coupled, respectively, to the first and second belt motion producing means. Means are additionally provided for displacing the supporting means and the first and second belt motion producing means such that the conveyor belt forms a downward loop between the first and second belt motion producing means under the weight of an article thereon. Finally, the overturning apparatus comprises means for controlling the first and second drive means such that the rotational velocity and direction of each of the belt motion producing means is individually selectable, the controlling means producing motion of the belt in the downward loop such that the article thereon is overturned.

DETAILED DESCRIPTION OF THE PREFERRED EMBODIMENT

Figure 1:
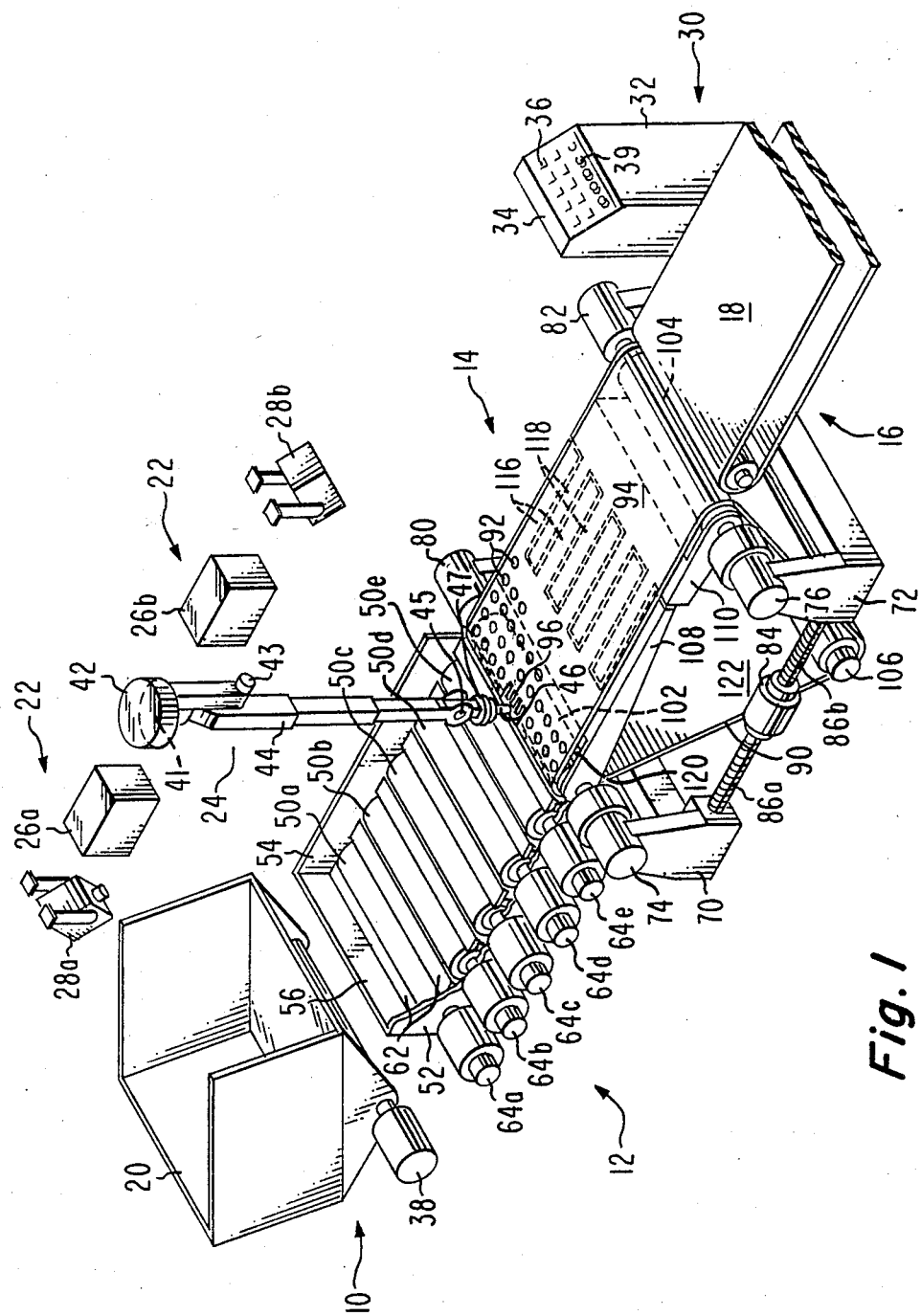
FIG. 1 illustrates the system of the preferred embodiment in a perspective view.

Referring to FIG. 1, there is shown an article manipulation system according to the preferred embodiment of the present invention. The preferred embodiment includes a singulation station 12 and a "facing" station 14, so-called because articles are manipulated there until a particular surface faces in a desired position. In addition, the preferred embodiment includes a dispensing station 10 and a dispatching station 16.

In the preferred embodiment, articles, typically parcels of the types described earlier as irregular pieces and parcels and flats, are spilled out of bin 20, comprising the dispensing station 10, into the singulation station 12. At this station 12, the parcels are singulated and individually conveyed to facing station 14, where the parcels are manipulated until a particular surface, typically including an addressee label, is visible by a machine vision system 22. Machine vision system 22 may typically include a plurality of light projectors 26a and 26b (two are shown), referred to collectively as light projectors 26, and a plurality of cameras 28a and 28b (two are shown), referred to collectively as cameras 28. Parcels are conveyed from the facing station 14 to a dispatching station 16 where an operator located at work position 30 may observe a destination code on the addressee label, typically a zip code, key the code into keyboard 36 of console 34 located on cabinet 32, and the parcel is conveyed therefrom via conveyor belt system 18 to a destination in accordance with the code information. Console 34 may typically also include displays and indicators 39 to provide instructions and status information to the operator.

In the dispensing station 10, parcels may typically be fed into bin 20 by a conveyor belt system (not shown) while bin 20 is in a first position for receiving and retaining parcels therein. At a time appropriate to the impletion of bin 20 and to the size of the heap of parcels already present at singulation station 12, bin 20 may be placed in a second position for dispensing parcels therefrom by the actuation of motor 38, illustratively, a stepper motor. As may be seen from FIG. 4, dispensing station motor 38 operates under the control of controller 40, wherein the information relating to the number of parcels in singulation station 12 is provided to controller 40 by machine vision system 22.

Singulation station 12 comprises a plurality of cylindrical rollers 50a through 50e, referred to collectively as rollers 50; five are shown in the present example. The rollers 50 have substantially equal cross section, and their central axes are parallel to each other and are located along a substantially horizontal plane. Rollers 50 are positioned in close proximity to the adjacent ones, but without physical contact. The topmost surface of the totality of rollers 50 forms a support surface for the parcels. The cylindrical outer surfaces of rollers 50 comprises a high-friction coating such as urethane rubber, so that rotational movement of rollers 50 tends to produce lateral movement of the parcels thereon.

Singulation station 12 is bounded on three sides by side walls 52 and 54 and rear wall 56, which retain parcels within singulation station 12 until they are conveyed into facing station 14. Side walls 52 and 54 may have bottom edges formed in a scalloped pattern to conform to the contours of rollers 50, and thus reduce the likelihood of a parcel being wedged between rollers 50 and either of the side walls 52, 54.

Parcels are prevented from being wedged between adjacent rollers 50, between end roller 50a and rear wall 56, and between front roller 50e and facing station 14, by a shield member illustratively comprising a plurality of slats 62 which are located between adjacent rollers 50, behind end roller 50a, and in front of front roller 50e. Slats 62 are typically fabricated of a relatively low friction material, such as stainless steel or polished aluminum, so that where contact occurs between slats 62 and a parcel, the parcel will slide easily to the adjacent roller 50. Slats 62 are positioned in close proximity to rollers 50 without making physical contact. The plane formed by the upper surfaces of slats 62 is below the parcel support surface formed by the topmost surfaces of the rollers 50.

Figure 4:
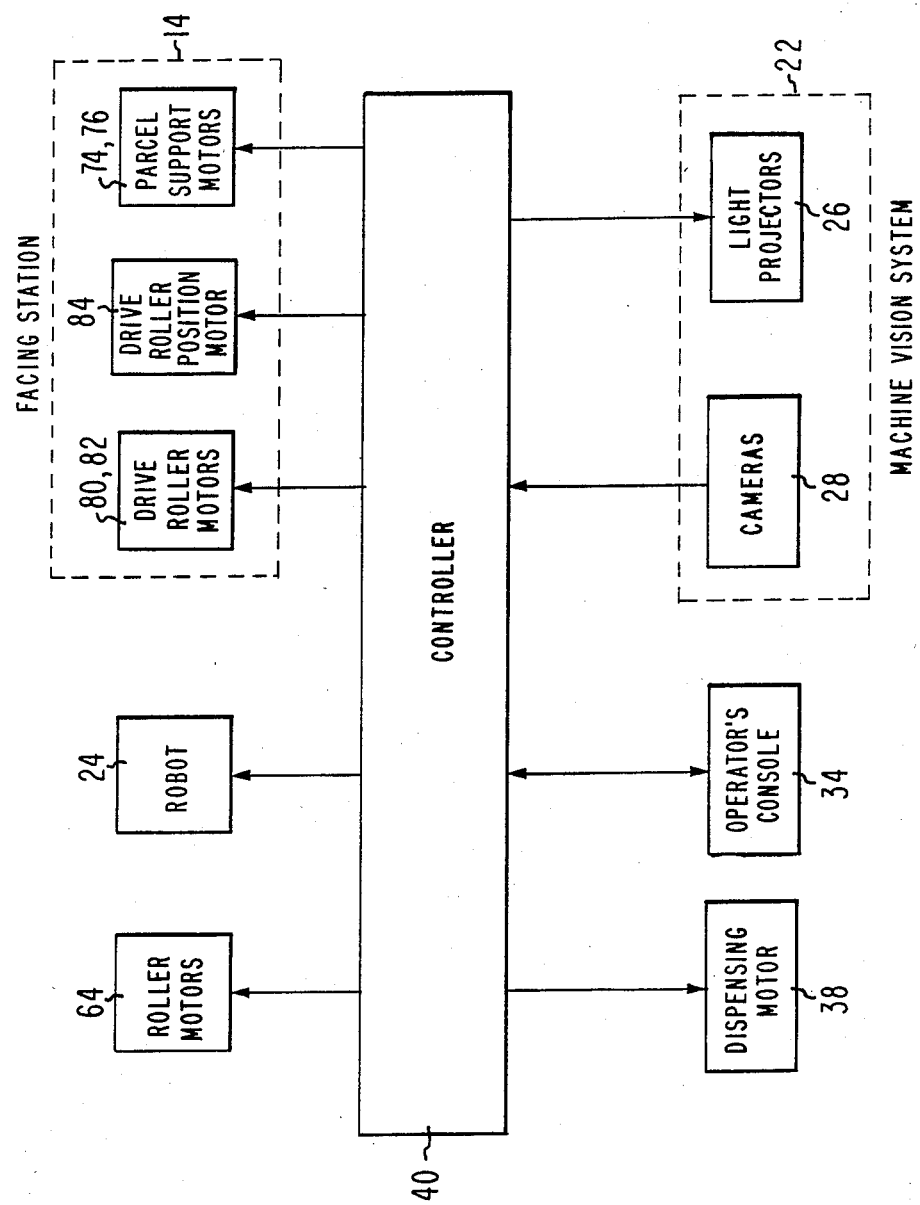
FIG. 4 is a block diagram representation useful in understanding the electrical signal interconnections of the FIG. 1 embodiment.

Coupled to one end of each of the rollers 50 of singulation station 12, but external to side wall 52, are a plurality of motors 64a through 64e collectively referred to as motors 64, coupled, respectively, to rollers 50a through 50e. Motors 64, which are independently controllable by controller 40, as shown in FIG. 4, may typically be stepper motors. Alternatively, motors 64 may be independent closed-loop servo motors. Motors 64 coordinate the rotational motion of rollers 50 so as to enhance the singulation process. When rollers 50 are moved together with the same rotational direction and velocity, they convey parcels thereon across singulation station 12 in a selectable direction. When rollers 50 are moved individually, they separate parcels from the heap, or move a single parcel forward. In this latter case, the rotation of rollers 50 should be considered as angular displacement, to produce a specific peripheral movement, rather than running at a particular speed.

The cooperative action of rollers 50 may not always produce singulation, i.e., isolation of a single parcel. The singulation process can be assisted by the action of robot 24 guided by machine vision system 22, which directs robot 24 to push or lift on parcels to separate them. There will not always be an advantageous point for such manipulation by robot 24; rollers 50 may then be activated to agitate the heaped parcels until a point advantageous for manipulation by robot 24 appears. The coordination of robot 24 and rollers 50 is provided by controller 40.

In the preferred embodiment, the operational area provided by rollers 50 in singulation station 12 may typically have a width of 18 inches (46 cm) and a length of 30 to 36 inches (76–91 cm). The diameter of the rollers 50 may typically assume a value of between 4 and 6 inches (10–15 cm); thus, in accordance with this example, the singulation station 12 may include between five and nine rollers 50.

Facing station 14 comprises an endless conveyor belt 90 formed in a generally triangular pattern about drive rollers 102 and 104 and idler roller 106. Drive rollers 102 and 104 each include a plurality of longitudinal splines 120 which engage corresponding teeth formed on the inner surface 122 of belt 90. The outer surface 94 of belt 90 includes a multiplicity of nubs 92, whose description and function are detailed in a succeeding paragraph.

Drive rollers 102 and 104 are independently driven to rotate by motors 80 and 82, respectively, which may be stepper motors. Alternatively, motors 80 and 82 may be closed-loop servo motors. When motors 80 and 82, which are controlled by controller 40, as shown in FIG. 4, cause rollers 102 and 104 to rotate in the same direction, belt 90 may be used to translate parcels across facing station 14 in a direction selectable by controller 40.

The upper region of belt 90, between drive rollers 102 and 104, is supported by interdigitated parcel supports 108 and 110. Support 108 includes a plurality of fingers 116 which mesh closely with a plurality of fingers 118 on support 110. When in the position shown in FIG. 1, parcel supports 108 and 110 form a flat and relatively continuous surface under the upper region of belt 90 for supporting parcels thereon.

Parcel supports 108 and 110 may be rotated from their positions shown in FIG. 1 downward such that fingers 116, 118 are directed generally toward idler 106. Supports 108 and 110 are driven to rotate thus by parcel support motors 74 and 76, respectively, which may typically be stepper motors. The operation of motors 74 and 76 is controlled by controller 40, as shown in FIG. 4. The rotational axes for supports 108 and 110 are virtually the same axes, respectively, as the rotational axes of drive rollers 102 and 104. Bearing arrangements which permit independent rotational motions of two devices on a common axis are well known in the art.

Facing station 14 additionally includes motor 84 having threaded shafts 86a and 86b extending axially therefrom. Threaded shaft 86a engages a correspondingly threaded portion of driver roller support 70, and oppositely-threaded shaft 86b engages a correspondingly threaded portion of drive roller support 72. Drive roller supports 70 and 72 support drive rollers 102 and 104, respectively, and establish their longitudinal position within facing station 14. Supports 70 and 72 are slidably positioned on bearing surfaces (not shown), such that actuation of motor 84, under the control of controller 40, as shown in FIG. 4, which actuation causes rotation of threaded shafts 86a and 86b, results in movement of drive roller supports 70, 72, either toward or away from one another.

Figure 2A:
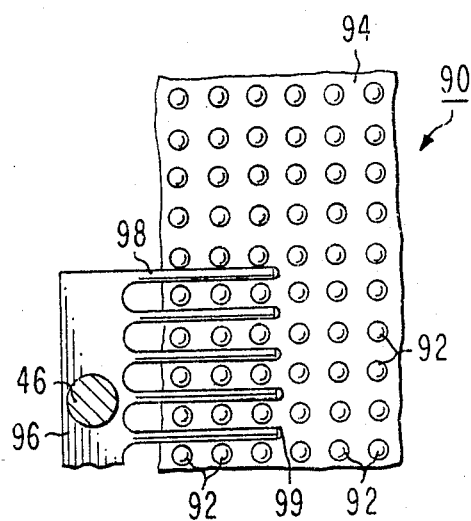
FIGS. 2a and 2b are plan and side views, respectively, of a portion of the facing station belt, including a portion of the robot arm.
Figure 2B:
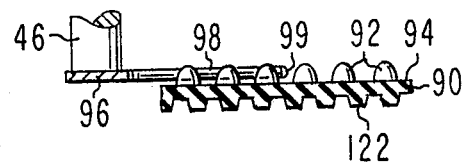

Referring to FIGS. 2a and 2b, there are shown plan and side views, respectively, of a portion of the belt 90 used in facing station 14 of the FIG. 1 embodiment. Belt 90 includes a plurality of nubs 92 which protrude from the upper surface 94 of belt 90. The lower surface 122 of belt 90 includes teeth for engagement with splines 120 of driver rollers 102, 104, as shown in FIG. 1.

Nubs 92 are positioned in a regular array of rows and columns. Hand section 46, extending from robot 24 (as shown in FIG. 1) includes a fork 96 having a plurality of tines 98, illustratively, twelve, although for ease of understanding, fewer are shown in FIGS. 1 and 2a. In one orientation of fork-like tool 96, tines 98 will fit between the rows of nubs 92. In a second orientation of fork 96, tines 98 will fit between the columns of nubs 92. Tines 98 have blunt or rounded tips 99 so that they may be used for pushing parcels with minimum likelihood of causing injury. Tines 98 are suitably dimensioned such that they move easily between the upper surface 94 of belt 90 and a parcel supported by nubs 92. Belt 90 may illustratively be fabricated of a molded rubber wherein nubs 92 are integrally formed into the upper surface 94 of belt 90.

One function of nubs 92 is that of supporting a parcel above surface 94 of belt 90 while tines 98 are slid underneath the parcel. Robot 24 may then lift the parcel and rotate it about any axis. A second purpose of nubs 92 is to provide a multiplicity of catch points to assist in the rotation of a parcel on belt 90. A parcel may be rotated by slipping the tines 98 of fork-like tool 96 under one edge of the parcel and lifting it. The opposite edge of the parcel may then tend to slide away, but it will be caught in a groove between the nubs 92, and the edge of the parcel caught in the groove becomes a fulcrum about which the parcel is rotated.

In the present example, wherein facing station 14 is intended for use with irregular parcels and flats, the upper surface 94 of belt 90 may have a width of 18 inches (46 cm) and a length of 24 inches (61 cm). The nubs 92 on belt 90 may typically have a diameter of 0.25 inch (6.3 mm) and a height above surface 94 of belt 90 of 0.25 inch (6.3 mm), and have a spacing between centers of 0.50 inches (12.7 mm), along both the longitudinal and lateral dimensions. Accordingly, the tines 98 of fork 96 may be 0.125 inch (3 mm) in diameter, and have a typical length of 2 inches (5.1 cm).

Figure 3B:
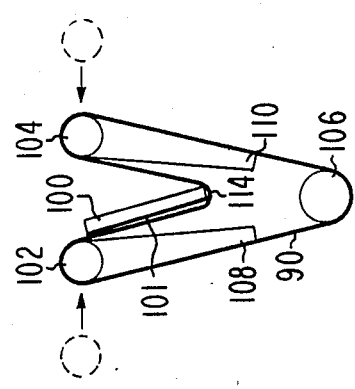
FIGS. 3a through 3d illustrate a method of overturning an article in the facing station of the FIG. 1 embodiment.
Figure 3D:
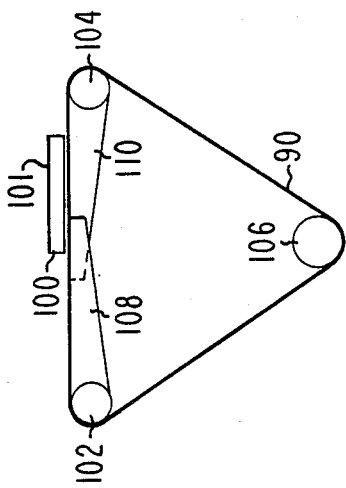
Figure 3A:
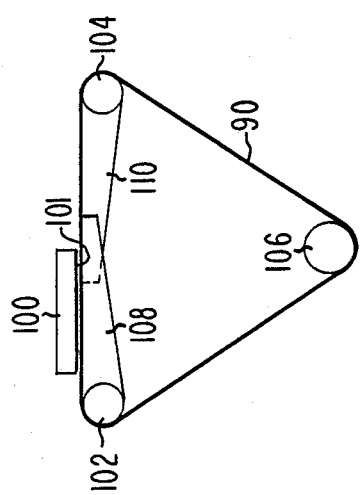

FIGS. 3a through 3d depict a sequence of events by which a relatively flat parcel 100, having an addressee label on surface 101 facing downward, may be inverted in an apparatus of the type shown as facing station 14 of the FIG. 1 embodiment. Referring to FIG. 3a, an endless conveyor belt 90 is wrapped about drive rollers 102 and 104 and idler 106. Interdigitated support members 108 and 110 are positioned under that portion of belt 90 between rollers 102 and 104 such that parcel 100 is supported thereon. In FIG. 3b, rollers 102 and 104 are shown as having been moved toward each other, and support members 108 and 110 have been rotated down toward idler 106, such that a downward loop 114 is formed in belt 90, into which parcel 100 falls.

Figure 3C:
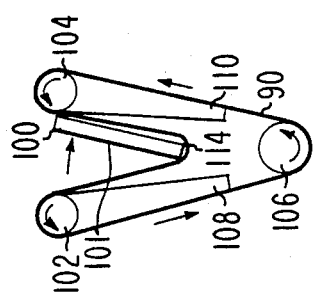

FIG. 3c depicts counterclockwise driving motion by drive rollers 102 and 104 resulting in motion of belt 90 as shown by the arrows in the drawing. This belt motion, in combination with the high-friction surface of belt 90, causes parcel 100 to shift from a first position leaning toward roller 102 to a second position leaning toward roller 104. Finally, in FIG. 3d it is seen that drive rollers 102 and 104 separate back to their original positions, support members 108 and 110 rotate to their belt supporting positions, and belt 90 returns from its loop 114 with parcel 100 inverted such that surface 101 is facing upward. While illustrated with a rectangular object, rolls, limp magazines and bags are manipulated with equal facility and without damage in facing station 14.

Throughout this disclosure, reference has been made to FIG. 4 which depicts, in block diagram representation, the interconnections between robot 24, various motors, the machine vision system 22 and the operator's console 34 to a controller 40. Summarizing FIG. 4, controller 40 controls the position of bin 20 in dispensing station 10 via signals to dispensing station motor 38. It provides the independent drive signals to the plurality of roller drive motors 64a through 64e in singulation station 12, the signals which control the adjustments of the plurality of joints in robot 24, and, in facing station 14, the drive signals to the left drive motor 80 for belt 90, the right drive motor 82 for belt 90, the motor 84 for positioning drive rollers 102 and 104, and the motors 74 and 76 for positioning the interdigitated parcel supports 108 and 110, respectively. Controller 40 additionally provides signals for controlling light projectors 26 in the machine vision system 22 and receives video information from the plurality of cameras 28 in that system 22. Finally, controller 40 interfaces with the functions provided at an operator's console 34, receiving information via keyboard 36 and sending information to indicators and displays 39 on console 34.

In the present example, controller 40 may be a stored-program microprocessor having a resident program for directing the operations of the article manipulation system of FIG. 1. Controller 40 may typically be located within the cabinet 32 housing the operator's console 34.

Robot 24, shown in the FIG. 1 embodiment as being mounted on a ceiling generally centrally above the singulation and facing stations 12, 14, may, for example, be of a type similar to the MAKER Robot System, sold by United States Robots, Carlsbad, Calif. The robot of the present example is a five-axis robot, having four rotary and one linear degrees of freedom.

Referring to robot 24 in FIG. 1, a first rotary joint 41 permits robot 24 to rotate with respect to the ceiling-mounted base 42. A second rotary joint at shoulder 43 permits arm 44 to be directed toward any point on singulation and facing stations 12, 14. Robot arm 44 telescopes to provide a linear adjustment. Wrist joint 45 is the third rotary joint, and hand section 46 is rotatable at rotary joint 47, the fourth rotary degree of freedom.

The machine vision system 22 of FIG. 1 is used to aid in the singulation process in singulation station 12 and aid in the manipulation process and to scan for an addressee label in facing station 14. More particularly, machine vision system 22 assesses the heap of parcels in singulation station 12, designating targets for fork-like tool 96 to push or lift for progressive singulation of parcels from the heap. It also verifies singulation of parcels in the facing station 14. If singulation has not been achieved, robot 24 is directed to singulate overlapping objects. Machine vision system 22 additionally scans parcels in the facing station 14 to locate the addressee label. It may be necessary to scan all surfaces and make a comparison before the most probable surface can be determined.

Machine vision system 22 may be implemented in any one of a number of schemes known to those skilled in the art. In general, all of these schemes employ light projecting means and one or more television cameras. The elements of the machine vision system 22 in the FIG. 1 embodiment are shown as being mounted overhead, but this configuration is not a necessary limitation on the invention.

One example of a machine vision system, although not necessarily the one preferred for the present invention, is disclosed in U.S. Pat. No. 4,435,837, issued Mar. 6, 1984, to F. H. Abernathy. According to another machine vision scheme, light projectors 26 may be slide projectors of ordinary construction which project a pattern of light stripes over the area determined by the extent of singulation station 12 or facing station 14, depending on which operation is being monitored by the machine vision system 22. Cameras 28 may be television cameras preferably utilizing solid state array sensors. Such sensors are well known to provide stable geometric precision and are widely used in machine vision applications.

The distance between a light projector 26 and any one camera 28 forms the base of a set of triangles whose sides are formed by the path of light in any specific projected stripe from projector 26, to the surface of a parcel, and then to a specific element in the array in camera 28. Since the angles are known by calibration, it is possible to determine the location of many points on the surface of the parcel, and from these points to infer the location and surface contour of the parcel.

This general technique and the mathematics supporting it are well known in the industry. The algorithms necessary for operating vision system 22 are executed in controller 40, which is shown with its interconnections to machine vision system 22 in FIG. 4.

In its function of scanning parcels in the facing station 14 for addressee labels, machine vision system 22, in conjunction with controller 40, may implement the following rules as programmed algorithms:

(1) If the article is thin and flat, only two surfaces need to be scanned. If the surfaces have a great deal of detail, e.g., unsleeved magazine covers, the label will most probably be in specific areas.

(2) If there is a mottled surface with a white rectangle, e.g., a label on a manila envelope, the label is facing up.

(3) The surface with the most information content, i.e., sharp edge transitions, most likely has the label.

(4) If the parcel is rectihedral but flat, e.g., a tie box, the label is on one of the two flat (large area) surfaces.

(5) If there is a stamp or postal meter label, it will be tagged with a fluorescent ink which will be visible under ultraviolet light. (Note: nearly all parcels with handwritten zip codes will have stamps or postal meter labels.)

(6) Cylindrical objects with printing at the ends are rolled newspapers. There is usually a central sleeve of manila paper with an address on it.

The above items represent a preliminary formulation of rules or guidelines which illustrate the approach which may be implemented between controller 40 and machine vision system 22 to control the processes within the facing station 14 of the present invention. One apparatus for recognizing a label on a parcel was disclosed in U.S. Pat. No. 3,840,739, issued Oct. 8, 1974, to A. B. Coulter.

While the principles of the present invention have been demonstrated with particular regard to the illustrated structure of the figures, it will be recognized that various departures from such illustrative structure may be undertaken in practice of the invention. The scope of this invention is not intended to be limited to the structure disclosed herein but should instead be gauged by the breadth of the claims which follow.

What is claimed is:

1. An apparatus for overturning generally flat articles, said apparatus comprising:
   a flexible, endless conveyor belt;
   first and second means for producing longitudinal motion of said conveyor belt, each of said first and second means having a longitudinal axis;
   means positioned under said conveyor belt intermediate said first and second belt motion producing means for supporting said belt in a substantially horizontal plane and comprising a pair of interdigitated support members pivoted about said axes, respectively;
   first and second drive means coupled, respectively, to said first and second belt motion producing means;
   means for displacing said supporting means and said first and second belt motion producing means such that said conveyor belt forms a downward loop between said first and second belt motion producing means under the weight of an article thereon, said means for displacing said supporting means providing rotational motion to said supporting means; and
   means for controlling said first and second drive means such that the rotational velocity and direction of each of said belt motion producing means is individually selectable, said controlling means producing motion of said belt in said downward loop such that said article thereon may be overturned.

2. The apparatus according to claim 1 wherein said means for displacing said first and second belt motion proxucing means provides lateral movements of said belt motion producing means.

3. A system for handling articles comprising:
   means for dispensing a plurality of said articles in an agglomeration;
   means for viewing said articles and for generating signals indicative of physical characteristics of said articles detected by said viewing means;
   means responsive to said signals for singulating individual articles from said agglomeration; and
   means responsive to said signals for overturning said singulated articles with predetermined surfaces of said singulated articles are visible by said viewing means, said overturning means including
   a flexible, endless conveyor belt;
   first and second means for producing longitudinal motion of said conveyor belt;
   means positioned under said conveyor belt intermediate said first and second belt motion producing means for supporting said belt in a substantially horizontal plane;
   first and second drive means coupled, respectively, to said first and second belt motion producing means;
   means responsive to said signals for displacing said supporting means and said first and second belt motion producing means such that said conveyor belt forms a downward loop between said first and second belt motion producing means under the weight of an article thereon, said means for displacing said supporting means providing rotational motion to said supporting means; and means for controlling said first and second drive means such that the rotational velocity and direction of each of said belt motion producing means is individually selectable, said controlling means being responsive to said signals for producing motion of said belt in said downward loop such that said article thereon may overturned.

4. The system according to claim 3 wherein said means for displacing said first and second belt motion producing means provides lateral movements of said belt motion producing means.

5. The system according to claim 3 further including means responsive to said signals for manipulating said articles in said agglomeration and said singulated articles.

6. The system according to claim 5 wherein said manipulating means includes a robotic manipulator capable of movement along five axes.

7. The systme according to claim 6 wherein said conveyor belt includes a surface having a multiplicity of substantially equal-sized nubs protruding upwardly therefrom said nubs supporting said articles above said surface of said conveyor belt.

8. The system according to claim 7 wherein said nubs are uniformly positioned in rows and columns along rectangular coordinates.

9. The system according to claim 8 wherein a terminal end of said robotic manipulator includes a fork-like tool having tines which, in a first position of said terminal end, may be introduced between said rows of said nubs and, in a second position of said terminal arm, may be introduced between said columns of said nubs, said tines being dimensioned to fit between said surface of said conveyor belt and an article supported by said nubs.

10. The system according to claim 3 wherein said singulating means includes:

a plurality of cylindrical rollers having substantially equal cross section, said rollers having their central axes parallel to each other and located along a substantially horizontal plane, each roller being positioned in close proximity to at least one adjacent roller, wherein the topmost surfaces of the totality of said rollers form a support surface for said articles;

a plurality of drive means coupled respectively to said plurality of rollers for rotating said rollers about their central axes; and means for controlling said drive means such that the rotational velocity and direction of each of said rollers is individually selectable.

11. The system according to claim 10 wherein the surfaces of said rollers include a high-friction substance.

12. The system according to claim 10 further including shield means located between each of said adjacent rollers and below said support surface for preventing said articles from falling between said rollers.

13. The system according to claim 10 wherein said shield means comprises a plurality of slats fabricated of stainless steel.

14. The system according to claim 3 wherein said articles are mailpieces and said predetermined surfaces include addressee labels.

15. The system according to claim 3 wherein said viewing means includes a machine vision system comprising a light projector and a television camera.

* * * * *